(12) United States Patent
Song et al.

(10) Patent No.: US 10,755,475 B2
(45) Date of Patent: Aug. 25, 2020

(54) DISPLAY APPARATUS AND METHOD OF DISPLAYING CONTENT INCLUDING SHADOWS BASED ON LIGHT SOURCE POSITION

(71) Applicant: SAMSUNG ELECTRONICS CO., LTD., Suwon-si (KR)

(72) Inventors: Hyun-a Song, Suwon-si (KR); Eun-seok Choi, Suwon-si (KR); Jin-hyuk Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/787,853

(22) Filed: Oct. 19, 2017

(65) Prior Publication Data
US 2018/0114359 A1 Apr. 26, 2018

(30) Foreign Application Priority Data
Oct. 26, 2016 (KR) .......................... 10-2016-0140176

(51) Int. Cl.
*G06T 15/60* (2006.01)
*H04N 21/422* (2011.01)
(Continued)

(52) U.S. Cl.
CPC .............. *G06T 15/60* (2013.01); *G09G 3/20* (2013.01); *H04N 21/42202* (2013.01);
(Continued)

(58) Field of Classification Search
CPC ..................... G06T 15/60; G06T 15/00–15/87
See application file for complete search history.

(56) References Cited

U.S. PATENT DOCUMENTS

| 9,449,427 B1* | 9/2016 | Baldwin ................. G06T 15/50 |
| 2005/0190197 A1* | 9/2005 | Ebi ..................... G01C 21/3667 |
| | | 345/589 |

(Continued)

FOREIGN PATENT DOCUMENTS

| KR | 101092466 B1 | 12/2011 |
| KR | 101639244 B1 | 7/2016 |
| WO | 2004/006578 A2 | 1/2004 |

OTHER PUBLICATIONS

Cheng, N., and Edwin Pat-Yak Lee. "Depicting daylighting: Types of multiple image display." Proceedings of the Association for Computer Aided Design in Architecture (ACADIA'01), Buffalo, New York. 2001. (Year: 2001).*

(Continued)

*Primary Examiner* — Daniel F Hajnik
(74) *Attorney, Agent, or Firm* — Sughrue Mion, PLLC

(57) ABSTRACT

Provided are a display apparatus and a method of displaying content. The display apparatus is capable of obtaining information about a light source around the display apparatus and providing a shadow effect on content to be displayed. The display apparatus may include a processor, a memory connected to the processor, and a display unit. The processor may be configured to receive light source position information about a position of a light source in a space where the display apparatus is located, determine a shadow image for content based on the light source position information, and display the content and the shadow image on the display unit.

18 Claims, 15 Drawing Sheets

(51) Int. Cl.
*H04N 21/485* (2011.01)
*G09G 3/20* (2006.01)

(52) U.S. Cl.
CPC ....... *H04N 21/485* (2013.01); *G06T 2200/24* (2013.01); *G09G 2340/14* (2013.01); *G09G 2360/144* (2013.01)

(56) References Cited

U.S. PATENT DOCUMENTS

| | | | | |
|---|---|---|---|---|
| 2007/0236485 | A1* | 10/2007 | Trepte | G06T 15/60 345/207 |
| 2010/0066750 | A1 | 3/2010 | Yu et al. | |
| 2010/0302244 | A1* | 12/2010 | Best | G06T 15/06 345/426 |
| 2013/0198786 | A1* | 8/2013 | Cook | H05B 37/0272 725/81 |
| 2014/0267270 | A1 | 9/2014 | Pappoppula et al. | |
| 2017/0078543 | A1* | 3/2017 | Lee | G02F 1/15 |
| 2017/0229059 | A1* | 8/2017 | Bonnier | G09G 5/10 |

OTHER PUBLICATIONS

NPL Video Titled "Interior Design—How to Cosy Up a Small Living-Dining Room", Published on Oct. 23, 2013, https://www.youtube.com/watch?v=BicmWMwcz5U; select screenshot included. (Year: 2013).*

Communication dated Mar. 9, 2018, issued by the European Patent Office in counterpart European application No. 17194667.6.

Communication dated Sep. 18, 2019, issued by the European Patent Office in counterpart European Application No. 19192681.5.

Levoy, Marc, "Rendering Mixtures of Geometric and Volumetric Data", Dec. 1988, Retrieved from the Internet: http://www.cs.unc.edu/techreports/88-052.pdf, XP055503879, 20 pages total.

* cited by examiner

DISPLAY APPARATUS AND METHOD OF DISPLAYING CONTENT INCLUDING SHADOWS BASED ON LIGHT SOURCE POSITION

CROSS-REFERENCE TO RELATED APPLICATION

This application claims the benefit of Korean Patent Application No. 10-2016-0140176, filed on Oct. 26, 2016, in the Korean Intellectual Property Office, the disclosure of which is incorporated herein in its entirety by reference.

BACKGROUND

1. Field

One or more embodiments relate to a display apparatus and a method of displaying content, and more particularly, to a display apparatus for displaying content and a shadow image thereof and a method of displaying the content.

2. Description of the Related Art

Display apparatuses have a function of displaying an image that can be viewed by users. Currently, most countries around the world have switched from analog broadcasting to digital broadcasting.

Recently, smart TV service providers have developed various services to provide content desired by users. In addition, smart TV service providers have developed technologies that provide visual effects to content to be displayed on a screen of a display apparatus in order to provide users with different experiences while allowing the users to use various services.

In recent years, technologies for giving visual effects to content, such as texts, images, and icons to be displayed, based on an environment around a display apparatus have been developed. For example, the display apparatus may provide a shadow effect to content to be displayed, based on the amount of light around the display apparatus and the position of a light source around the display apparatus.

Conventionally, when a single illuminance sensor is used to recognize a light source around a display apparatus, the position of the light source and the number of light sources may not be recognized, and only the amount of light may be measured. In addition, when a plurality of illuminance sensors are used to recognize the position of a light source around a display apparatus and the number of light sources around the display apparatus, the manufacturing cost of the display apparatus increases and it is difficult to estimate an exact direction of the light source when there is an obstacle around the display apparatus.

SUMMARY

One or more embodiments include a display apparatus and method capable of obtaining information on the position of a light source around the display apparatus and providing a shadow effect to content according to the light source without adding a sensor device module.

One or more embodiments include a display apparatus and method capable of easily obtaining information on the position of a light source around the display apparatus to provide a shadow effect, by providing a user interface for obtaining the information on the position of the light source around the display apparatus.

One or more embodiments include a display apparatus and method capable of providing stereoscopic effects to display content by using external information such as information of light sources, time, and weather, and providing a differentiated experience to users.

Additional aspects will be set forth in part in the description which follows and, in part, will be apparent from the description, or may be learned by practice of the presented embodiments.

According to one or more embodiments, a display apparatus includes a processor, a memory connected to the processor, and a display unit, wherein the processor is configured to receive light source position information about a position of a light source in a space where the display apparatus is located, determine a shadow image for content based on the light source position information, and display the content and the shadow image on the display unit.

According to one or more embodiments, a method of displaying content on a display apparatus includes receiving light source position information about a position of a light source in a space where the display apparatus is located, determining a shadow image for content based on the light source position information, and displaying the content and the shadow image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
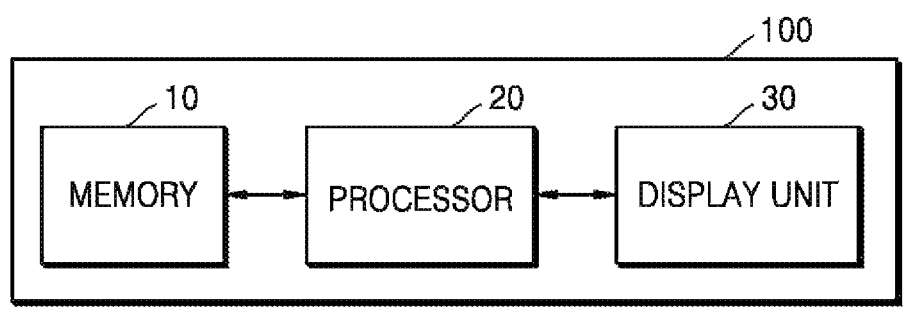
FIG. 1 is a block diagram of a display apparatus according to an embodiment.

Embodiments will be described more fully hereinafter with reference to the accompanying drawings. A method of configuring and using a display apparatus according to embodiments will be described more fully hereinafter with reference to the accompanying drawings. The same reference numerals in the drawings denote the same components or elements that perform the same functions.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of embodiments. As used herein, the term "and/or" includes any and all combinations of one or more of the associated listed items. Expressions such as "at least one of," when preceding a list of elements, modify the entire list of elements and do not modify the individual elements of the list.

In the specification, the term "display" may indicate a component having a function of visually outputting image data. Also, when a display panel and a touch pad included in a display have a layer structure to configure a touch screen according to an implementation example, the display may also be used as an input apparatus besides an output apparatus. The display may include at least one of a liquid crystal display (LCD), a thin film transistor-liquid crystal display (TFT-LCD), an organic light-emitting diode (OLED), a flexible display, a three-dimensional (3D) display, an electrophoretic display, and a plasma display panel (PDP).

A "display apparatus" is one of output apparatuses including the display described above and is an apparatus capable of visually displaying image data. The display apparatus may be connected to a desk top, a laptop, a tablet personal computer (PC), a camera, a cellular phone, a storage medium, and other electronic devices to receive image data wirelessly or by wire. According to an implementation, the display apparatus may receive an analog broadcast signal or a digital broadcast signal. The display apparatus may be implemented as a flat display apparatus, a curved display apparatus having a curvature, or a flexible display apparatus having an adjustable curvature. The display apparatus may include a PC monitor and a television (TV) monitor and may include a large format display (LFD). The display apparatus may include two or more displays according to an implementation shape.

A part of the display of the display apparatus on which content is actually output may be referred to as a screen.

Also, throughout the specification, the term "user" may mean a person who controls a function or an operation of the display apparatus and may include a manager or an installation engineer.

The terminology used herein is for the purpose of describing embodiments only and is not intended to be limiting of embodiments. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof but do not preclude the presence or addition of one or more other features, integers, steps, operations, elements, components, and/or groups thereof.

FIG. 1 is a block diagram of a display apparatus 100 according to an embodiment.

The display apparatus 100 shown in FIG. 1 is an apparatus capable of obtaining information on a light source around the display apparatus 100 and providing a shadow effect on content to be displayed.

The display apparatus 100 may be, for example, a smart TV, a smart phone, a network sound bar, a head mound display (HMD), a head up display (HUD), a wearable device, a tablet personal computer (PC), a PC, a laptop, a global positioning system (GPS), a digital broadcast terminal, a navigation, a kiosk, a digital camera, and any one of other mobile or non-mobile computing devices, but is not limited thereto. Also, the display apparatus 100 may be a virtual reality (VR) device for providing a VR image, which has a communication function and a data processing function, an augmented reality (AR) device for providing an AR image, a watch, glasses, a hair band and a ring.

The content to be displayed may include video content, such as a movie or drama, and an image. In addition, the content may include information provided via a clock, a calendar, and a wired or wireless communication.

The display apparatus 100 may receive information on a light source position of a space in which the display apparatus 100 is located, without using an illuminance sensor.

The display apparatus 100 may be located in an indoor space. A light source of the indoor space may include a light source inside the indoor space and a light source outside the indoor space.

The light source of the indoor space may include, for example, a lighting device (e.g., a lamp, a stand, and an auxiliary light) located in the indoor space, and a window, a porch door, a door, and the like in the indoor space.

The position of the lighting device located in the indoor space is mostly unchanged. Hereinafter, the lighting device located in the indoor space is referred to as a 'fixed light source'.

Hereinafter, a window, a porch door, a door, or the like, through which external light may be incident into the indoor space, except for a lighting device located inside the indoor space are referred to as an 'external light source'. Natural light may be incident through a window, a porch door, a door, or the like in the indoor space, and the amount of light (hereinafter, referred to "light amount") of the natural light and a light source position for the natural light may be changed according to weather and time.

The display apparatus 100 may directly receive information on a light source position of the indoor space from the user. The display apparatus 100 may determine a shadow image of content by using the information on the light source position.

The shadow image is an image that adds a shadow effect to content or shows an effect of brightening a bright side that is a part opposite to a shadow. Hereinafter, displaying content and a shadow image includes displaying content combined with a rendered shadow image.

Referring to FIG. 1, the display apparatus 100 includes a memory 10, a processor 20, and a display unit 30.

The memory 10 according to an embodiment may store various pieces of data, a program, or an application for driving and controlling the display apparatus 100. The program stored in the memory 10 may include one or more instructions. The program (one or more instructions) or the application stored in the memory 10 may be executed by the processor 20.

For example, the memory 10 may store one or more instructions for determining a shadow image for content based on the position of a light source in a space.

In addition, one or more instructions may be stored in the memory 10 to provide a user interface for obtaining light source position information in the display apparatus 100. In addition, one or more instructions for estimating the position of a light source according to current weather and time may be stored in the memory 10.

The processor 20 according to an embodiment may execute one or more programs stored in the memory 10. The processor 20 may include a single core, a dual core, a triple core, a quadruple core, or may be a higher multi-core processor. In addition, the processor 20 may include a plurality of processors.

The processor 20 according to an embodiment may receive light source position information that is information on the position of a light source in a space where the display apparatus 100 is located.

The light source position information may include the position of a fixed light source that is a lighting device located in an indoor space, and the position of an external light source that is a light source which provides light from the outside of the indoor space to the indoor space. The position of an external light source may include a position range of an external light source corresponding to the position of a window, a porch door, a door, or the like, which is an external light source. The position range of an external light source may vary depending on the position and size of a window or the like through which external light is incident.

The processor 20 may receive information on the position of a fixed light source and information on the position of an external light source.

The processor 20 according to an embodiment may determine a shadow image for content based on light source position information.

The processor 20 according to an embodiment may be configured to display the content and the determined shadow image on the display unit 30.

The processor 20 according to an embodiment may be configured to display a user interface indicating a space on the display unit 30.

The processor 20 according to an embodiment may receive, via the user interface, an input that selects the position of a light source in a space. Selecting the position of a light source may include selecting the position of a fixed light source and selecting a position range of an external light source.

In addition, the processor 20 according to an embodiment may receive position information of a display apparatus in a space.

A user interface according to an embodiment may include a plane corresponding to a space. In this case, the processor 20 may receive an input for selecting the position of a light source on the plane via the user interface.

A user interface according to an embodiment may include a three-dimensional space corresponding to a space. In this case, the processor 20 may receive an input for selecting the position of a light source on the three-dimensional space via the user interface.

The processor 20 may receive a user input for selecting the position of a fixed light source. The position of a fixed light source may be received via a control apparatus (not shown) such as a remote control or an external device (not shown).

The processor 20 may determine a position range of an external light source, based on an input for selecting the position of the external light source. Here, the position range of the external light source may be the position of a window, a door, a porch or the like.

The processor 20 may determine the position and light amount of an external light source, based on at least one of current time and current weather.

The processor 20 may obtain the current time and weather via wired or wireless communication of the display apparatus 100. In addition, the processor 20 may use time information stored in advance in the display apparatus 100.

The processor 20 may determine the shape of a shadow image based on the light amount and position of the external light source when the light amount of the external light source is equal to or greater than a predetermined amount.

According to an embodiment, the shape of the shadow image may include the direction and length of the shadow.

In addition, the processor 20 may determine the brightness of the shadow image based on the determined light amount and position of the external light source.

The processor 20 may determine the shape of the shadow image based on an on or off state of a fixed light source and the position of the fixed light source when the light amount of the external light source is less than the predetermined amount.

According to an embodiment, the processor 20 may receive the on or off state of the fixed light source via a sensor (not shown) that senses light.

The display unit 30 may display a user interface indicating a space under the control of the processor 20.

Also, the display unit 30 may display a shadow image determined based on the light source position information under the control of the processor 20.

Figure 2:
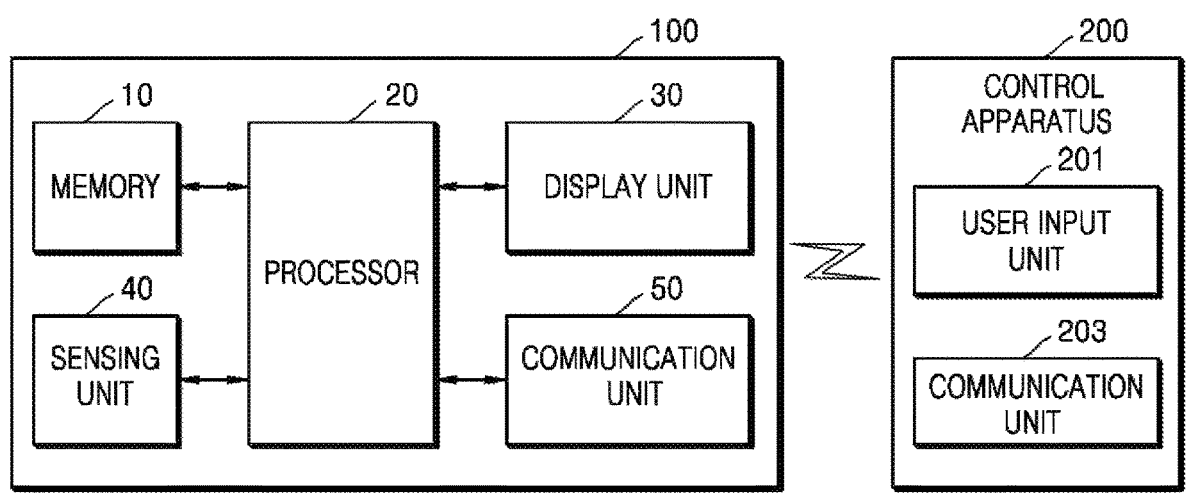
FIG. 2 is a block diagram of a system including a display apparatus according to an embodiment and a control apparatus connected wirelessly to the display apparatus.

FIG. 2 is a block diagram of a system including a display apparatus 100 according to an embodiment and a control apparatus 200 connected wirelessly to the display apparatus 100.

Referring to FIG. 2, the display apparatus 100 includes a memory 10, a processor 20, a display unit 30, a sensing unit 40, and a communication unit 50. Descriptions of the memory 10, the processor 20, and the display unit 30, which are the same as those in FIG. 1, will be omitted.

The sensing unit 40 shown in FIG. 2 may include a sensor for sensing light, and may detect whether a light source is on or off.

The communication unit 50 may transmit or receive data and signals to or from the control apparatus 200 under the control of the processor 20. The communication unit 50 may include at least one of a wireless LAN, Bluetooth, and wired Ethernet.

The communication unit 50 according to an embodiment may obtain current weather information and current time information. Instead of receiving the current weather information and the current time information from the communication unit 50, the control apparatus 200 may receive an input directly from a user.

In addition, the communication unit 50 according to an embodiment may obtain emotion information of the user via an electronic device (not shown) used by the user.

In addition, the communication unit 50 according to an embodiment may receive an on or off state directly from a fixed light source through communication with the fixed light source (a lighting device).

The processor 20 according to an embodiment may determine the position and light amount of an external light source, based on the current weather information and the current time information obtained from the communication unit 50.

In addition, the processor 20 according to an embodiment may determine content and a shadow image to be displayed, based on the emotion information of the user obtained from the communication unit 50.

The control apparatus 200 shown in FIG. 2 controls the function of the display apparatus 100. The control apparatus 200 may be, for example, a remote control, but is not limited thereto, and may include an electronic device capable of controlling the function of the display apparatus 100, for example, a smart phone and a tablet.

Referring to FIG. 2, the control apparatus 200 may include a user input unit 201 and a communication unit 203.

The user input unit 201 may receive a user input. The user input may include, for example, an input for moving a cursor displayed on a screen of the display unit 30 of the display apparatus 100. The user input may also include an input for selecting the position of a fixed light source and a position range of an external light source.

Specifically, the user input may include an input for changing the position of a light source up and down or right and left on a screen by using a four-directional key button of the control apparatus 200.

The control apparatus 200 may control the function of the display apparatus 100, based on a user input received via the user input unit 201.

For example, the user input unit 201 may include at least one of a key (including a button), a touch pad, a pointing device, a microphone (not shown) capable of receiving a user's voice, and a sensor (not shown) capable of recognizing a motion of the control apparatus 200.

The communication unit 203 according to an embodiment may transmit or receive signals to or from the display apparatus 100.

The communication unit 203 may transmit or receive signals to or from the display apparatus 100 by using, for example, a near field communication including infrared or Bluetooth.

Figure 3:
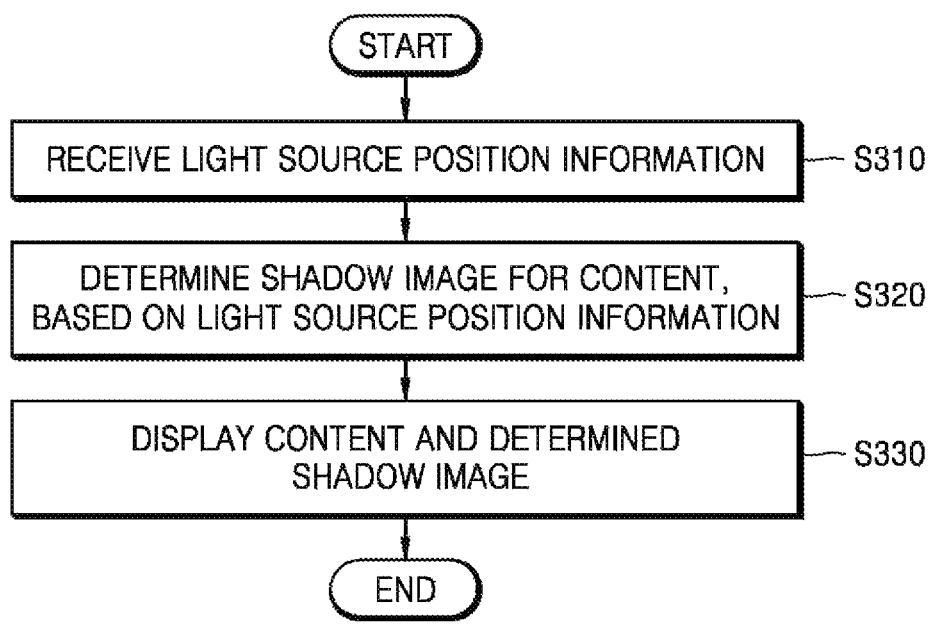
FIG. 3 is a flowchart of a method of displaying content on the display apparatus according to an embodiment.

FIG. 3 is a flowchart of a method of displaying content on the display apparatus 100 according to the embodiment.

In Operation S310, the display apparatus 100 may receive light source position information. The light source position information may be information on the position of a light source in a space where the display apparatus 100 is located.

In Operation S320, the display apparatus 100 may determine a shadow image for content, based on the light source position information.

In Operation S330, the display apparatus 100 may display the content and the determined shadow image.

Figure 4A:
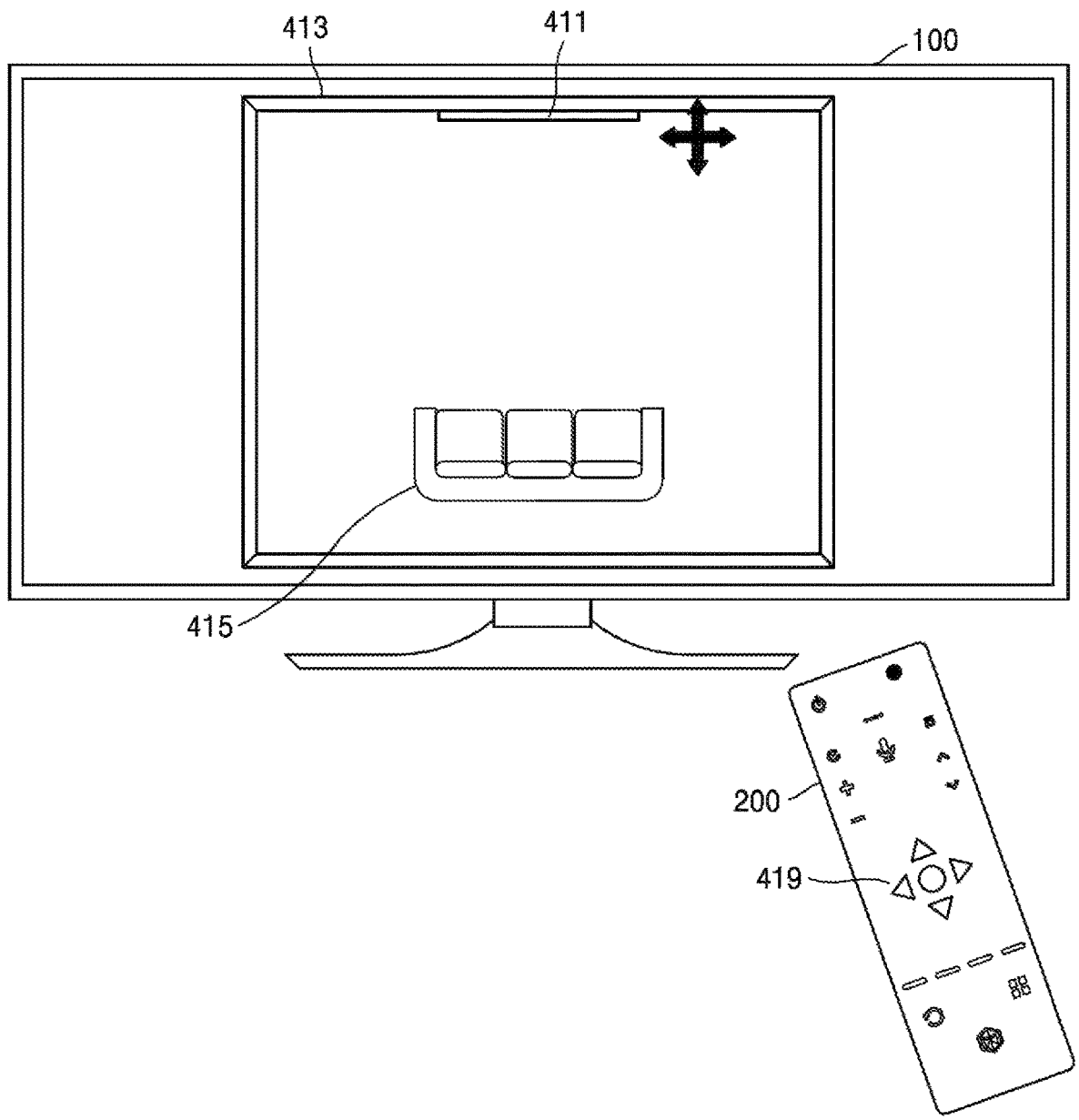
FIG. 4A is a view for explaining that the display apparatus according to an embodiment receives position information of the display apparatus via a user interface.

FIG. 4A is a view for explaining that the display apparatus 100 according to an embodiment receives position information of the display apparatus 100 via a two-dimensional user interface.

The display apparatus 100 may display a two-dimensional user interface 413 indicating an indoor space. The two-dimensional user interface 413 indicating the indoor space may be a plane corresponding to the indoor space in which the display apparatus 100 is located.

According to an embodiment, a user may select which one of a two-dimensional user interface and a three-dimensional user interface is to be displayed, through a setting menu of the display apparatus 100. Alternatively, one of a two-dimensional user interface and a three-dimensional user interface may be determined by the initial setting of the display apparatus 100.

Referring to FIG. 4A, the display apparatus 100 may receive a user input for selecting a position 411 of the display apparatus 100 via a control apparatus 200. The user input may include changing the position of the display apparatus 100 up and down or right and left in the two-dimensional user interface 413 by using a four-directional key button 419 of the control apparatus 200.

In addition, the display apparatus 100 may receive an input for a position 415 where a user mainly watches the display apparatus 100, via the control apparatus 200.

Figure 4B:
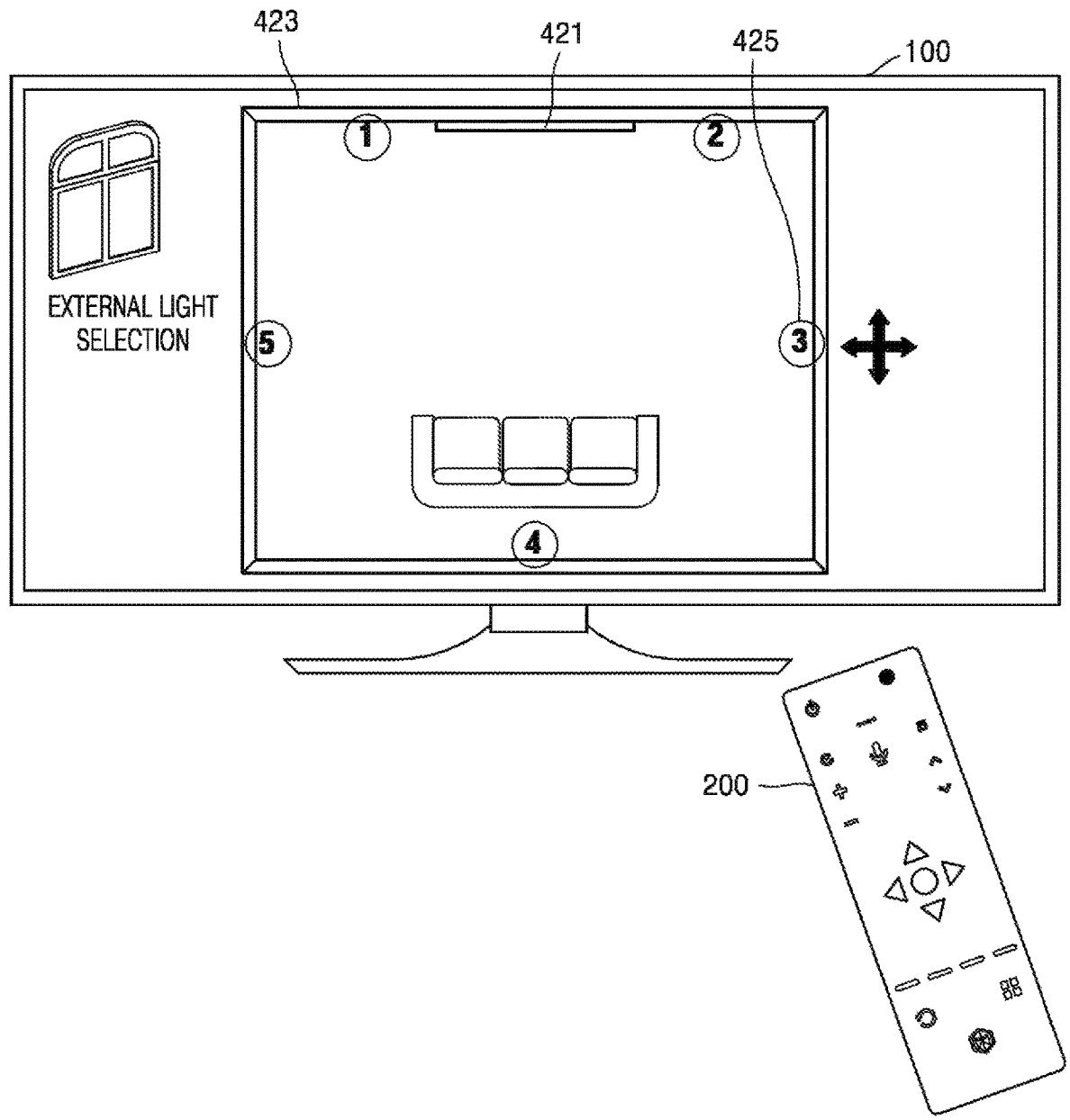
FIG. 4B is a view for explaining that the display apparatus according to an embodiment receives the position of an external light source via a user interface.

FIG. 4B is a view for explaining that the display apparatus 100 according to an embodiment receives the position of an external light source via a two-dimensional user interface.

The display apparatus 100 may receive an input from the user to select any one of a fixed light source and an external light source. In addition, the display apparatus 100 may be set to select any one of the position of a fixed light source and the position of an external light source.

The display apparatus 100 may display a two dimensional user interface 423 indicating a predetermined position around a position 421 of the display apparatus 100.

The display apparatus 100 may receive a user input for selecting a position 425 of an external light source.

Specifically, as shown in FIG. 4B, the display apparatus 100 may receive an input for selecting one of ①, ②, ③, ④, and ⑤ via the control apparatus 200. The selected position 425 of the external light source may be adjusted up and down or left and right on a screen by using the control apparatus 200.

Figure 4C:
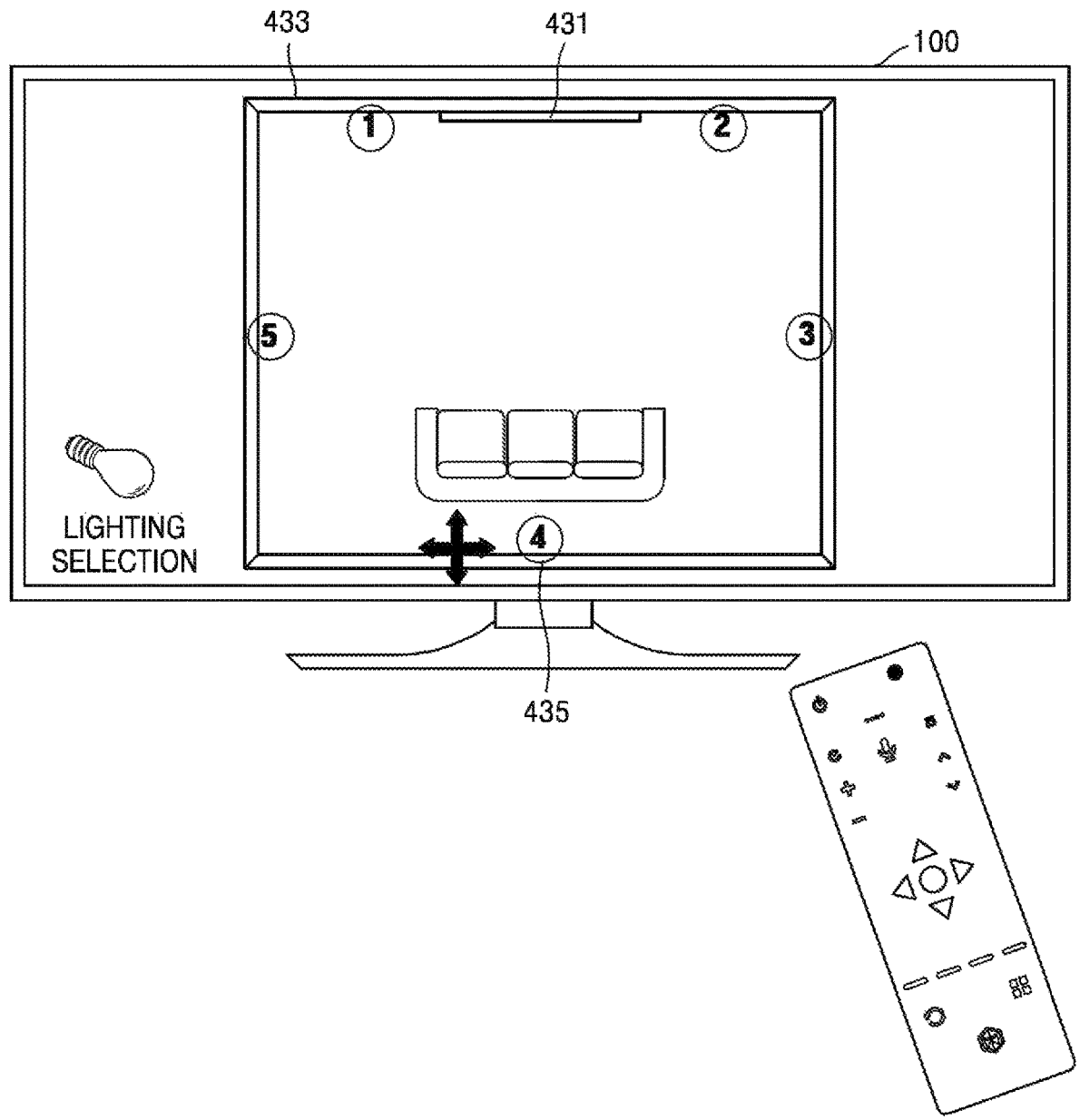
FIG. 4C is a diagram for explaining that the display apparatus according to an embodiment receives the position of a fixed light source via a user interface.

FIG. 4C is a diagram for explaining that the display apparatus 100 according to an embodiment receives the position of a fixed light source via a two-dimensional user interface.

The display apparatus 100 may display a two-dimensional user interface 433 indicating a predetermined position around a position 431 of the display apparatus 100.

The display apparatus 100 may receive a user input for selecting a position 435 of a fixed light source.

Specifically, as shown in FIG. 4C, the display apparatus 100 may receive an input for selecting one of ①, ②, ③, ④, and ⑤ via the control apparatus 200. The selected position 435 of the fixed light source may be adjusted up and down or left and right on a screen by using the control apparatus 200.

Figure 4D:
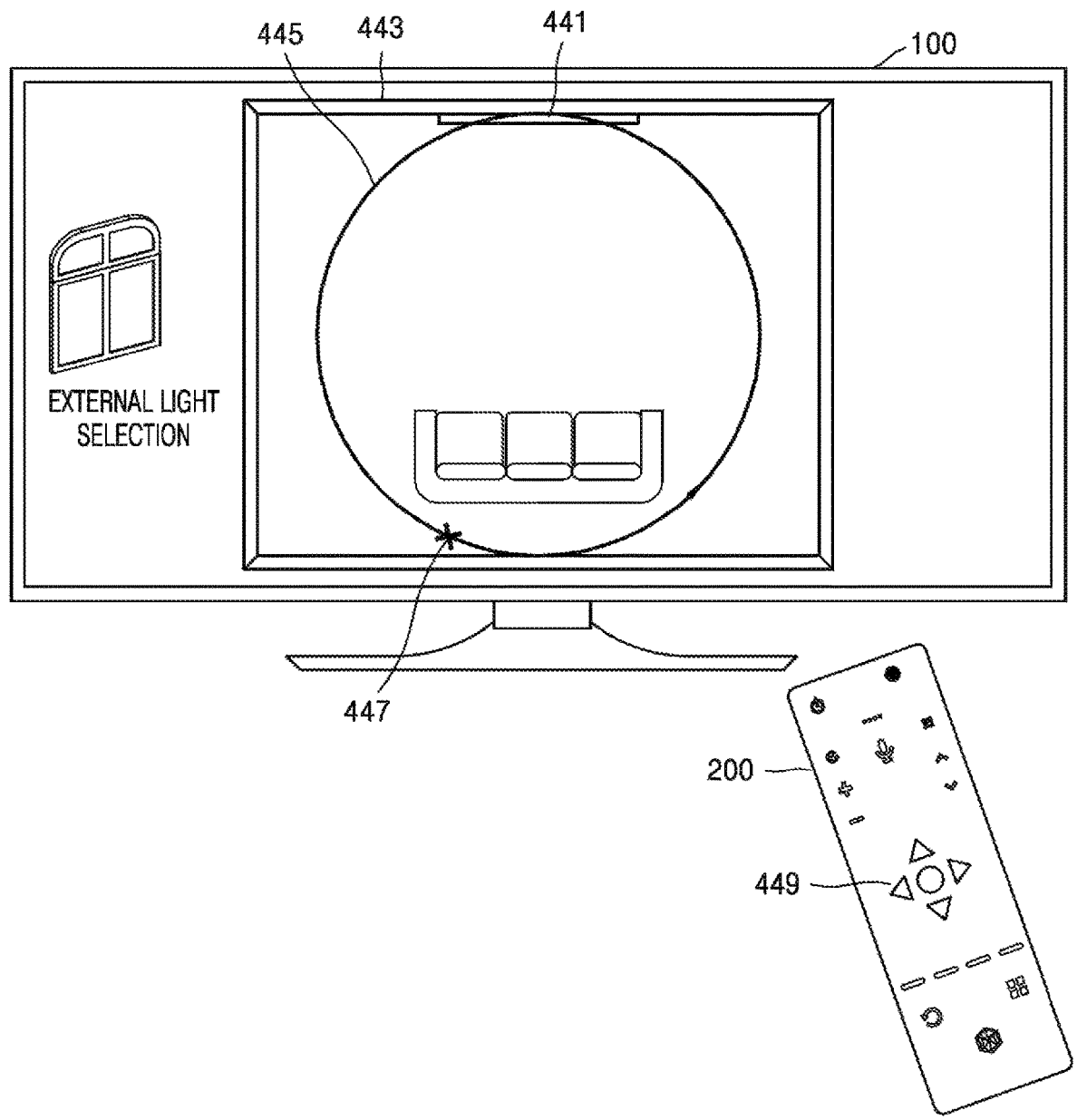
FIG. 4D is a view for explaining that the display apparatus according to an embodiment receives the position of an external light source via a user interface.

FIG. 4D is a view for explaining that the display apparatus 100 according to an embodiment receives the position of an external light source via a two-dimensional user interface.

The display apparatus 100 may display a two-dimensional user interface 443 indicating a circle 445 around a position 441 of the display apparatus 100.

The display apparatus 100 may receive a user input for selecting a position 447 of an external light source.

Specifically, as shown in FIG. 4D, the display apparatus 100 may move a cursor along the circle 445 to the position 447 of the external light source via the control apparatus 200. For example, the cursor may be adjusted through an up and down button input or left and right button input of a four-direction key button 449 of the control apparatus 200.

As described with respect to an external light source with reference to FIG. 4B, the display apparatus 100 may receive the position of an external light source via the two-dimensional user interface 443.

Figure 5A:
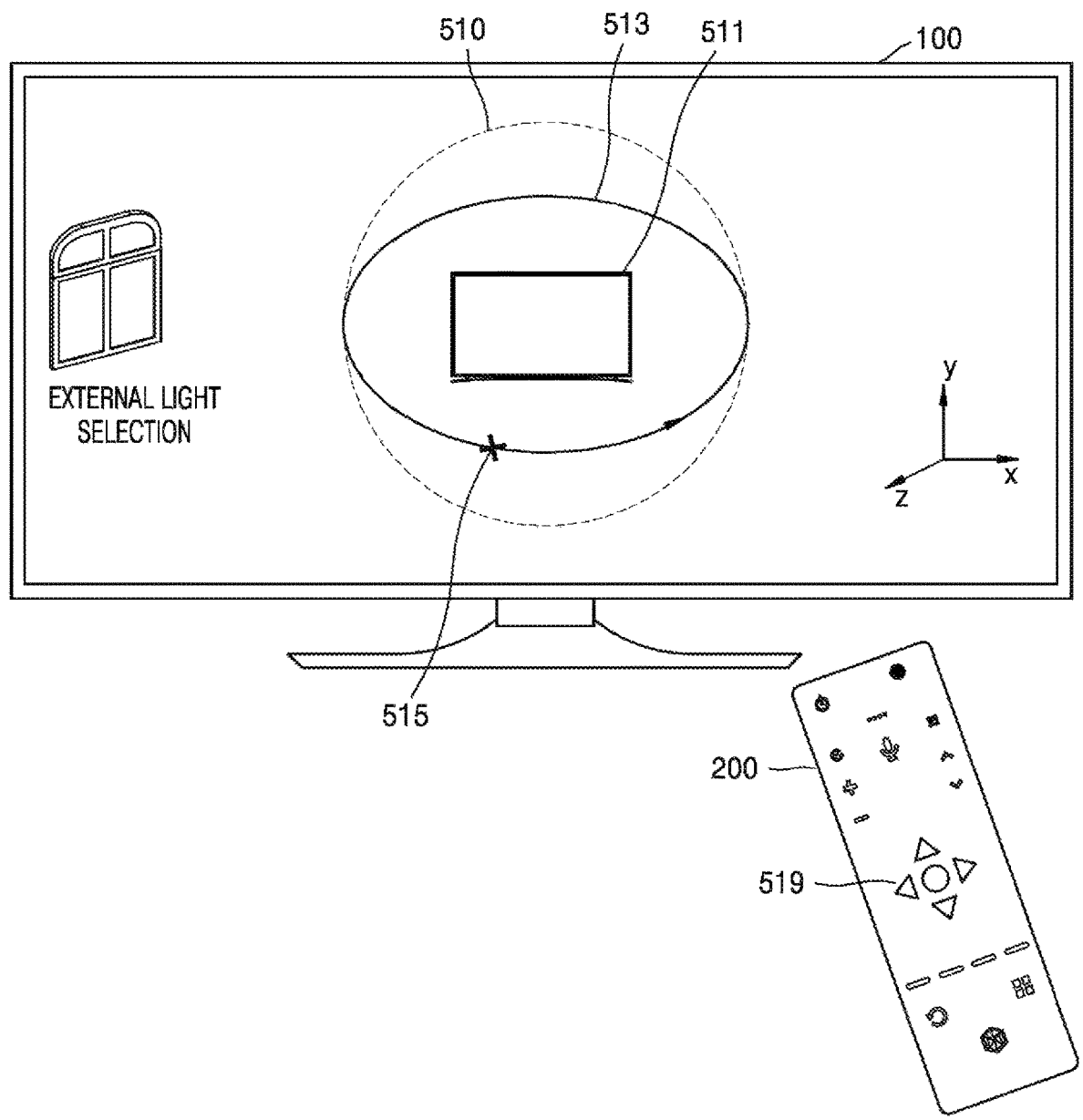
FIG. 5A is a view for explaining that the display apparatus according to an embodiment receives the position of an external light source via a user interface.

FIG. 5A is a view for explaining that the display apparatus 100 according to an embodiment receives the position of an external light source via a three-dimensional user interface.

The display apparatus 100 may display a three-dimensional user interface indicating a three-dimensional space 510 around a position 511 of the display apparatus 100. The three-dimensional space 510 may be a three-dimensional space corresponding to an indoor space where the display apparatus 100 is located.

The display apparatus 100 may receive an input for selecting the position of an external light source in the three-dimensional space 510 via the three-dimensional user interface.

For example, the display apparatus 100 may receive an input for selecting the position of an external light source on an x-z plane in the three-dimensional space 510 via the three-dimensional user interface.

According to an embodiment, the display apparatus 100 may move a cursor along a circle 513 corresponding to the x-z plane to a position 515 corresponding to the position of the external light source, based on a button input of a key button 519 of the control apparatus 200.

Figure 5B:
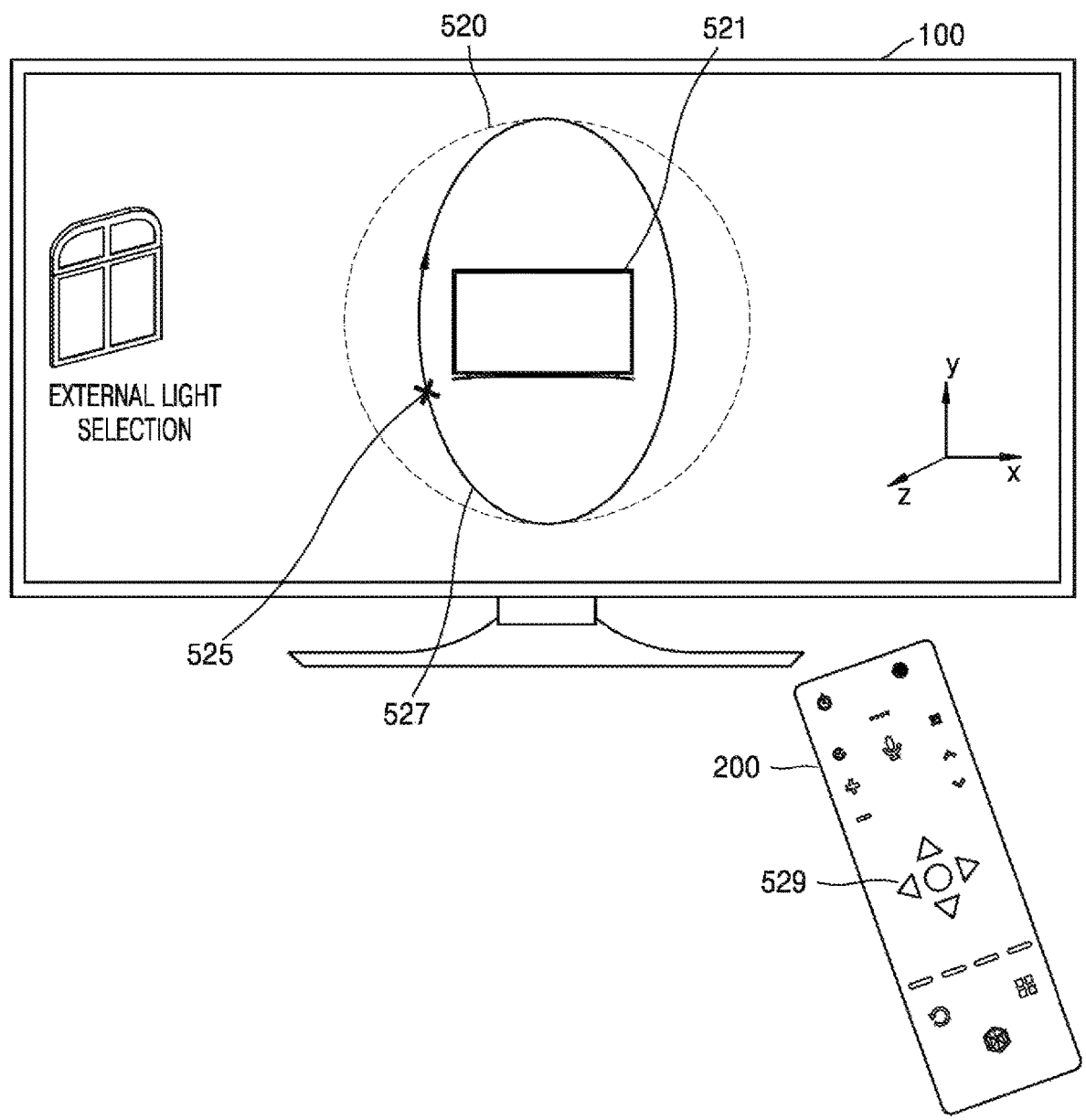
FIG. 5B is a view for explaining that the display apparatus according to an embodiment receives the position of an external light source via a user interface.

FIG. 5B is a view for explaining that the display apparatus 100 according to an embodiment receives the position of an external light source via a three-dimensional user interface.

The display apparatus 100 may display a three-dimensional user interface indicating a three-dimensional space 520 around a position 521 of the display apparatus 100.

The display apparatus 100 may receive an input for selecting a point on a plane perpendicular to an x-z plane in the three-dimensional space 520 via the three-dimensional user interface.

The display apparatus 100 may display a circle 527 corresponding to a plane perpendicular to the x-z plane.

According to an embodiment, the display apparatus 100 may move a cursor along the circle 527 corresponding to a plane perpendicular to the x-z plane to a position 525 corresponding to the position of the external light source, based on a button input of a key button 529 of a control apparatus 200.

As described with respect to the position of an external light source with reference to FIGS. 5A and 5B, the display apparatus 100 may receive the position of a fixed light source via the two-dimensional user interface.

Figure 6:
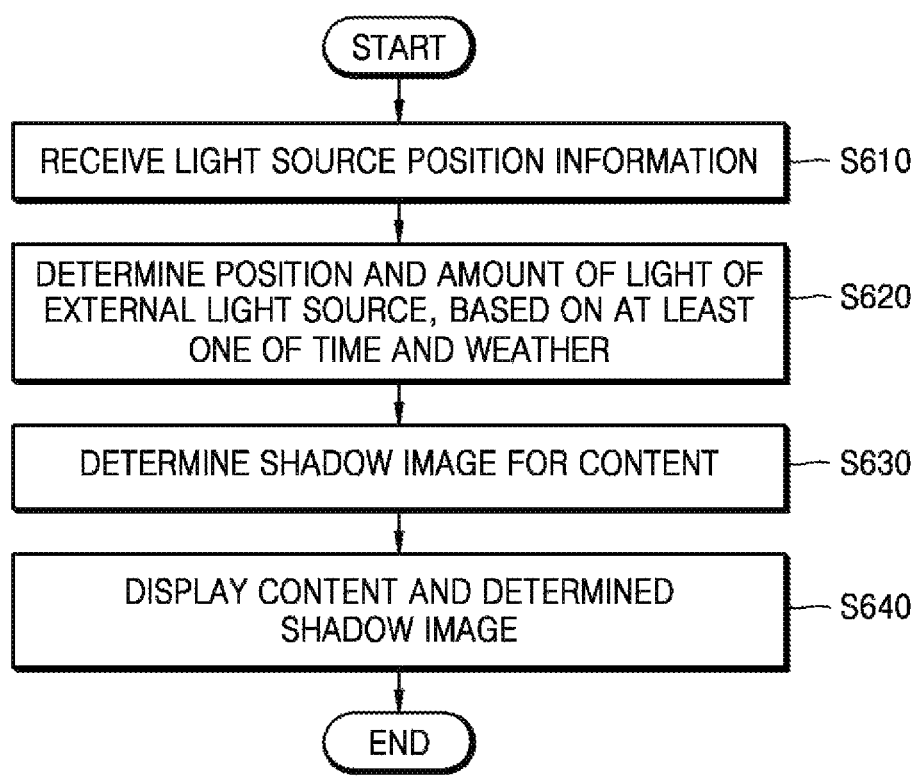
FIG. 6 is a flowchart of a method of displaying content on the display apparatus, according to an embodiment.

FIG. 6 is a flowchart of a method of displaying content on the display apparatus 100, according to an embodiment.

In Operation S610, the display apparatus 100 may receive light source position information. The light source position information may be information on the position of a light source in an indoor space in which the display apparatus 100 is located.

In Operation S620, the display apparatus 100 may determine the position and light amount of an external light source, based on at least one of time and weather.

In Operation S630, the display apparatus 100 may determine a shadow image for content.

In Operation S640, the display apparatus 100 may display the content and the determined shadow image.

Figure 7A:
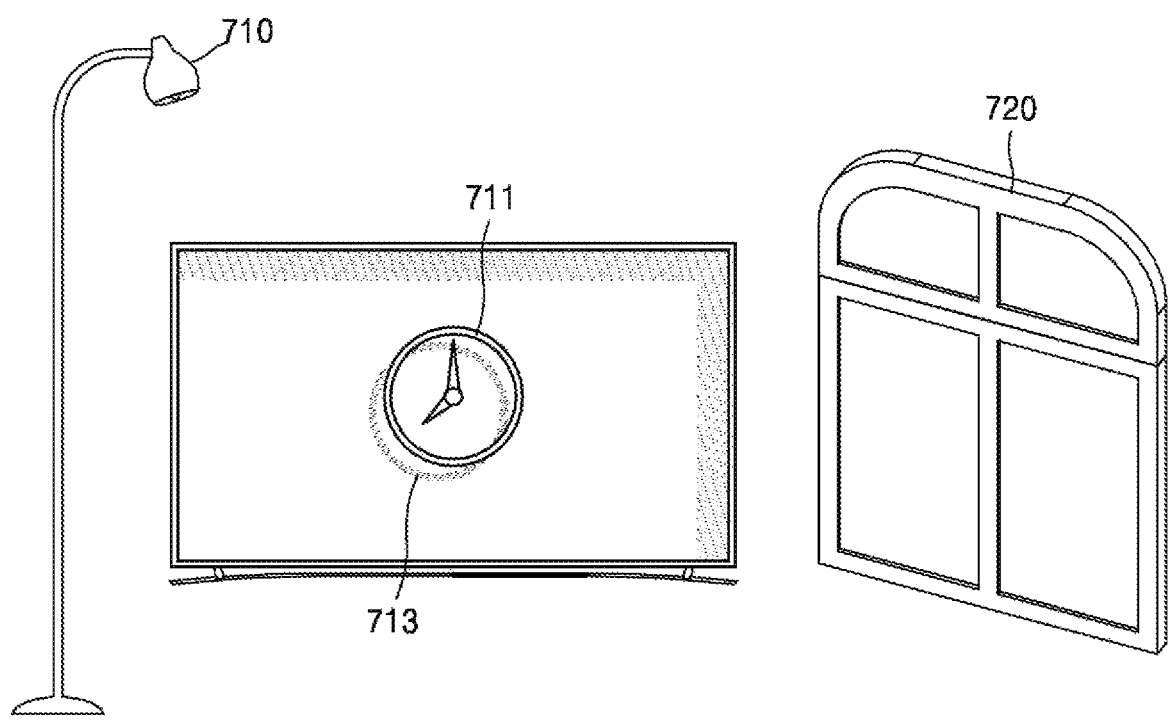
FIG. 7A is a view for explaining that the display apparatus according an embodiment displays a shadow image.

FIG. 7A is a view for explaining that the display apparatus 100 according an embodiment displays a shadow image.

Referring to FIG. 7A, the display apparatus 100 may be in a frame mode. The frame mode may be a mode in which preset content is displayed for a preset time while an image is not viewed through the display apparatus 100.

For example, in the frame mode, the display apparatus 100 may display predetermined content. For example, the display apparatus 100 may display a calendar, a clock, and a slide show of preset images. In addition, the display apparatus 100 may reproduce music through an audio output unit (not shown) in addition to displaying the content.

The display apparatus 100 according to an embodiment may determine a shadow image 713 for content 711, based on the position of a fixed light source 710 and a position range of an external light source 720.

FIG. 7A shows a case where a light amount of the external light source 720 is equal to or greater than a predetermined amount.

When the light amount of the external light source 720 is equal to or greater than the predetermined amount, the display apparatus 100 may ignore a shadow effect by the position of the fixed light source 710 and display only a shadow effect by the external light source 720.

In this case, the display apparatus 100 may determine the shape of the shadow image 713 based on the light amount and position of the external light source 720. The shape of the shadow image may include the brightness of a shadow and the size and direction of the shadow.

The display apparatus 100 according to an embodiment may determine the light amount of the external light source 720, based on the current time and weather. For example, the light amount of the external light source 720 may vary depending on the current time or the current season, and may vary depending on whether the current weather is clear or cloudy.

In addition, the display apparatus 100 may determine the position of the external light source 720 based on the current time. For example, the display apparatus 100 may determine the position of the external light source 720 within a previously received position range of the external light source 720.

The display apparatus 100 may render the shadow image 713, determined based on the light amount and position of the external light source 720, on the content 711 and display a rendered shadow image.

Figure 7B:
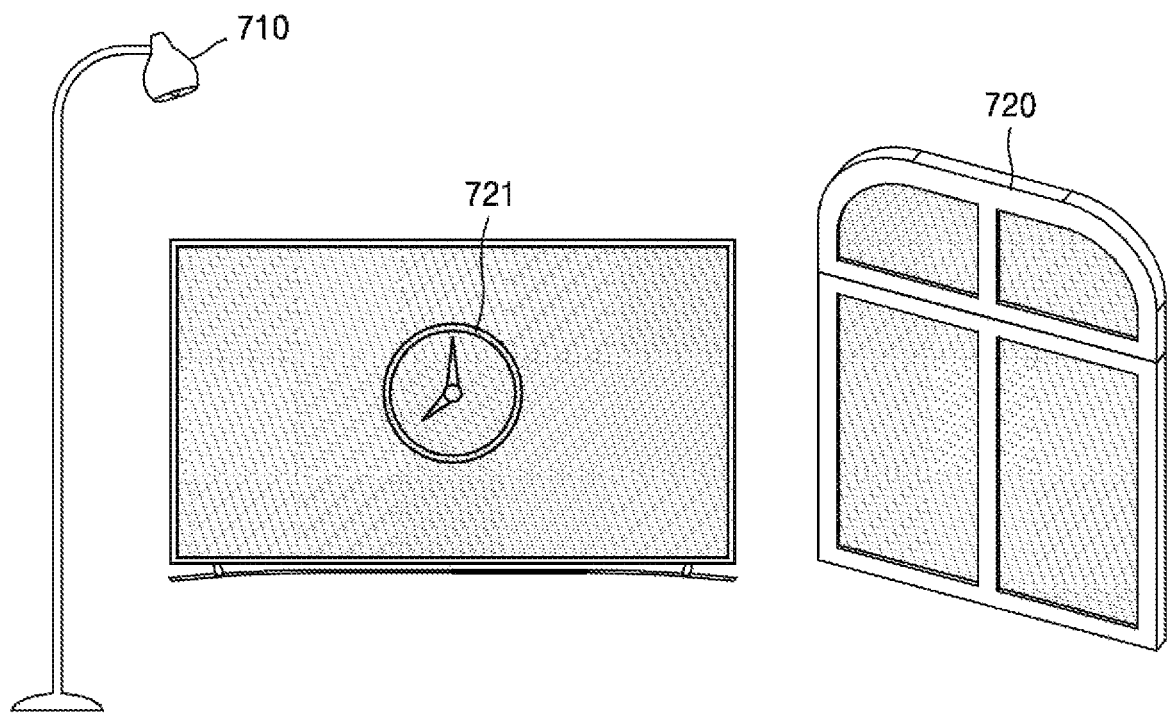
FIG. 7B is a view for explaining that the display apparatus according to an embodiment displays a shadow image.

FIG. 7B is a view for explaining that the display apparatus 100 according to an embodiment displays a shadow image.

FIG. 7B shows a case where each of the light amount of a fixed light source 710 and the light amount of an external light source 720 is less than the predetermined amount.

When both the light amount of the fixed light source 710 and the light amount of the external light source 720 are less than the predetermined amount, the display apparatus 100 may not display a shadow image for content 721.

Figure 7C:
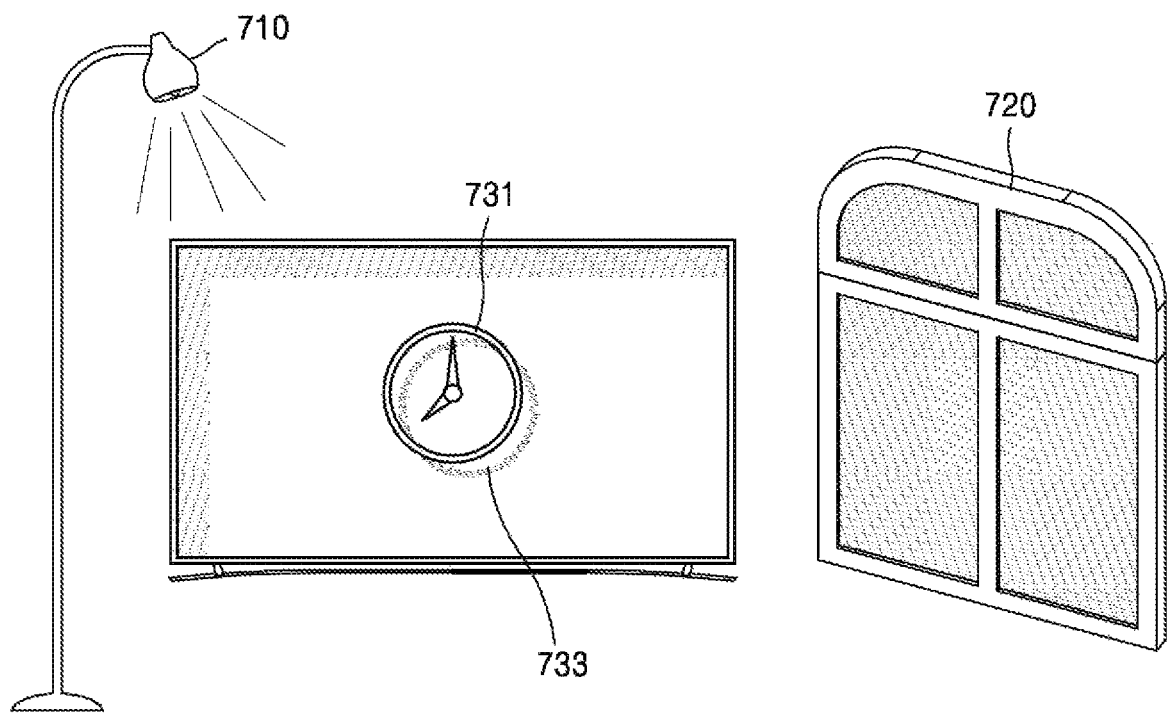
FIG. 7C is a view for explaining that the display apparatus according to an embodiment displays a shadow image.

FIG. 7C is a view for explaining that the display apparatus 100 according to an embodiment displays a shadow image.

FIG. 7C shows a case where the light amount of an external light source 720 is less than the predetermined amount.

In this case, the display apparatus 100 may determine a shadow image 733 for content 731 based on the position of an internal light source 710.

The display apparatus 100 may render the determined shadow image 733 on the content 731 and display a rendered shadow image.

Figure 8:
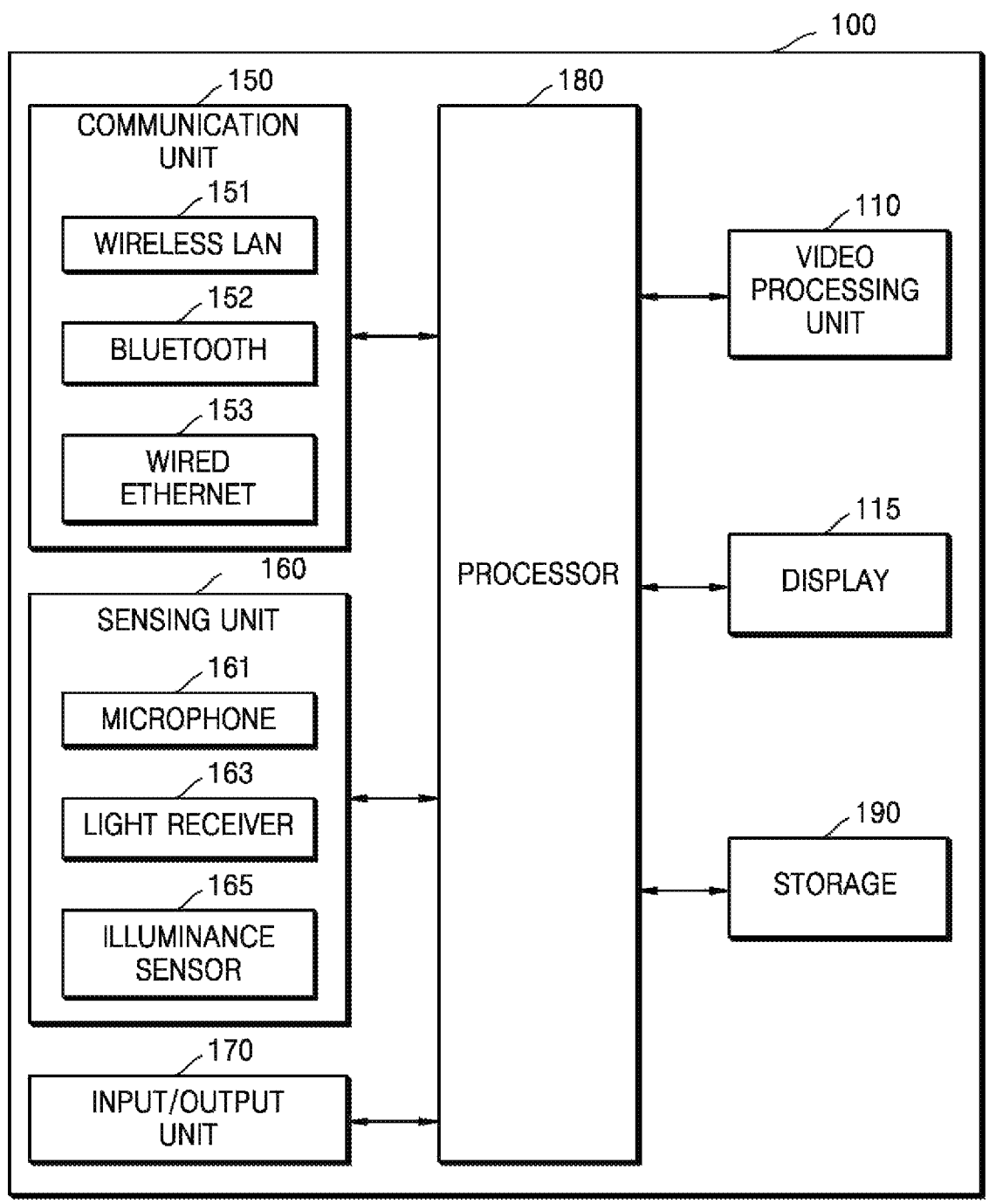
FIG. 8 is a detailed configuration diagram of a display apparatus according to an embodiment.

FIG. 8 is a detailed configuration diagram of a display apparatus 100 according to an embodiment.

Referring to FIG. 8, the display apparatus 100 includes a video processing unit 110, a display 115, a communication unit 150, a sensing unit 160, an input/output unit 170, a processor 180, and a storage 190.

The video processing unit 110 processes video data received by the display apparatus 100.

The display 115 displays, on a screen, a video included in a broadcast signal received through a tuner unit (not shown)

under the control of the processor 180. The display 120 may also display content (for example, a moving image) input through the communication unit 150 or the input/output unit 170, under the control of the processor 180. The display 120 may output an image stored in the storage 190 under the control of the processor 180.

The display 115 shown in FIG. 8 may include the display unit 30 of FIG. 1.

The communication unit 150 may connect the display apparatus 100 to an external apparatus (for example, an audio apparatus) under the control of the processor 180. The processor 180 may transmit/receive content to/from the external apparatus connected via the communication unit 150, download an application from the external apparatus, or perform web-browsing. The communication unit 150 may include a wireless local area network (LAN) 151, a Bluetooth network 152, or a wired Ethernet network 153 according to the performance and structure of the display apparatus 100. The communication unit 150 may include a combination of the wireless LAN 151, the Bluetooth network 152, and the wired Ethernet network 153.

The communication unit 150 may receive a control signal of the control apparatus 200 under the control of the processor 180. The control signal may be implemented as a Bluetooth signal, a radio frequency (RF) signal, or a Wi-Fi signal.

The communication unit 150 may further include local communication (for example, near field communication (NFC)) (not shown) or Bluetooth low energy (BLE) (not shown)), instead of the Bluetooth network 152.

The communication unit 150 may include the communication unit 50 of the display apparatus 100 shown in FIG. 2

The sensing unit 160 senses a voice of a user, an image of the user, or an interaction with the user.

A microphone 161 receives an uttered voice of the user. The microphone 161 may convert the received voice into an electrical signal and output the electrical signal to the processor 180. The user voice may include, for example, a voice corresponding to a menu or function of the display apparatus 100.

The microphone 161 may be integrated with or separate from the display apparatus 100. The separate microphone 161 may be electrically connected to the display apparatus 100 via the communication unit 150 or the input/output unit 170.

A light receiver 163 receives an optical signal (including a control signal) from the control apparatus 200 via a light window (not shown) of a bezel of the display 115. The light receiver 163 may receive an optical signal corresponding to a user input (for example, touch, pressing, a touch gesture, a voice, or a motion) from the control apparatus 200. A control signal may be extracted from the received optical signal under the control of the processor 180

It will be easily understood by those of ordinary skill in the art that the light receiver 163 may be excluded depending on the performance and structure of the display apparatus 100.

The Input/output unit 170 receives video (for example, a moving image), audio (for example, a voice or music), and additional information (for example, an EPG) from the outside of the display apparatus 100 under the control of the processor 180.

It will be easily understood by those of ordinary skill in the art that the structure and operation of the Input/output unit 170 may be variously implemented according to embodiments.

The processor 180 controls an overall operation of the display apparatus 100 and signal transfer among the internal components 110 to 190 of the display apparatus 100 and processes data. When there is an input of a user or stored preset conditions are satisfied, the processor 180 may execute an operation system (OS) and various applications, stored in the storage 190.

The processor 180 may include a graphics processing unit (GPU) (not shown) for performing video graphics processing. The processor 180 may be implemented by using a System On Chip (SoC) into which a core (not shown) and a GPU (not shown) are incorporated.

The processor 180 of FIG. 8 may include all functions of the processor 20 of FIG. 1 or 2

The storage 190 may store various data, programs, or applications for driving and controlling the display apparatus 100 under the control of the processor 180. The storage 190 may store input/output signals or data corresponding to driving of the video processing unit 110, the display 115, the communication unit 150, the sensing unit 160, and the input/output unit 170.

The storage 190 may store a control program for controlling the display apparatus 100 and the processor 180, a presentation module for constituting a display screen, and an application initially provided by a manufacturer or downloaded from the outside. Specifically, the storage 190 may store resources such as a JavaScript file and an XML file which are used in an application.

The storage 190 may include a presentation module. The presentation module is a module for configuring a display screen. The presentation module includes a multimedia module for reproducing and outputting multimedia content and a user interface (UI) rendering module for performing UI and graphics processing. The multimedia module may include a player module, a camcorder module, a sound processing module, and the like. Accordingly, the multimedia module produces and reproduces a screen image and a sound by reproducing various types of multimedia content. The UI rendering module may include an image compositor module for composing an image, a coordinate combination module for combining coordinates on a screen on which an image is to be displayed, an X11 Module for receiving various events from hardware, and a two-dimensional (2D)/three-dimensional (3D) UI toolkit that provides a tool for constructing a 2D or 3D UI.

In addition, the storage 190 may include a graphical user interface (GUI) associated with an application, objects (for example, an image, a text, an icon, and a button) for providing the GUI, user information, documents, databases, or related pieces of data.

According to an embodiment, the term "storage" includes the storage 190, a read only memory (ROM) that stores a control program for controlling the display apparatus 100, a random access memory (RAM) that stores signals or data input from the outside or is used as a storage area corresponding to various operations performed in the display apparatus 100, or a memory card (not shown) (for example, a micro SD card or a USB memory) mounted in the display apparatus 100. The storage 190 may include a non-volatile memory, a volatile memory, a flash memory, a hard disk drive (HDD), or a solid state drive (SSD).

The storage 190 may include a volume control module, a communication control module, a voice recognition module, a motion recognition module, a light receiving module, a display control module, an audio control module, an external input control module, a power control module, a power control module of a wirelessly (for example, Bluetooth)

connected external apparatus, a voice database (DB), or a motion DB, which are not shown. These modules and the DBs of the storage 190, which are not shown, may be implemented as software in order to perform in the display apparatus 100 a volume control function, a communication control function, a voice recognition function, a motion recognition function, a light receiving control function, an audio control function, an external input control function, a power control function, or a display control function for controlling display of a cursor. The processor 180 may perform these functions by using the software stored in the storage 190.

The storage 190 shown in FIG. 8 may include the memory 10 of FIG. 1 or 2.

The display apparatus 100 may be electrically connected to an external apparatus (for example, a set-top box (not shown)) having a tuner. For example, the display apparatus 100 may be implemented by using an analog TV, a digital TV, a 3D TV, a smart TV, an LED TV, an OLED TV, a plasma TV, a monitor, or the like, but it will be easily understood by those of ordinary skill in the art that embodiments are not limited thereto.

At least one of the components 110 to 190 shown in the display apparatus 100 of FIG. 8 may be omitted in accordance with the performance of the display apparatus 100. In addition, another component may be added to the display apparatus 100 of FIG. 8 in accordance with the performance of the display apparatus 100. It will be easily understood by those of ordinary skill in the art that the positions of the components 110 to 190 may be changed in accordance with on the performance or structure of the display device 100.

Figure 9:
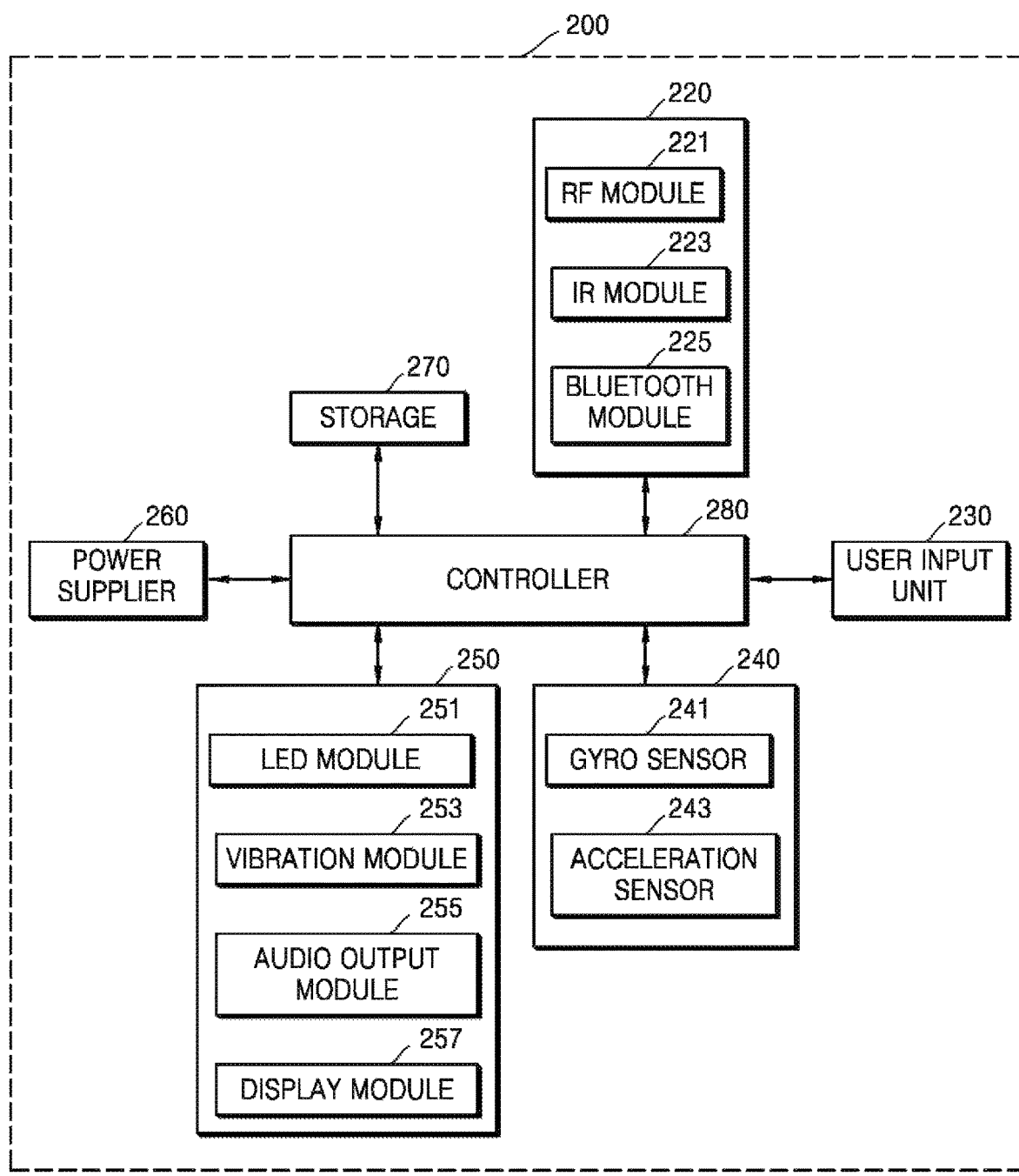
FIG. 9 is a block diagram of a control apparatus according to an embodiment.

FIG. 9 is a block diagram of a control apparatus 200 according to an embodiment.

Referring to FIG. 9, the control apparatus 200 may include a wireless communication unit 220, a user input unit 230, a sensor 240, an output unit 250, a power supplier 260, a storage 270, and a controller 280. The wireless communication unit 220 may transmit and receive signals to and from the above-described display apparatus 100. The wireless communication unit 220 may include an RF module 221 that may transmit and receive signals to and from the display apparatus 100 according to an RF communication standard. The wireless communication unit 220 may also include an IR module 223 that may transmit and receive signals to and from the display apparatus 100 according to an IR communication standard. The wireless communication unit 220 may also include a Bluetooth module 225 that may transmit and receive Bluetooth-type signals to and from the display apparatus 100.

The wireless communication unit 220 may include the communication unit 203 of the control apparatus 200 of FIG. 2.

In an embodiment, the control apparatus 200 may transmit a signal including information on motions and the like of the control apparatus 200 to the display apparatus 100 via the RF module 221.

The control apparatus 200 may receive a signal transmitted by the display apparatus 100 via the RF module 221. If necessary, the control apparatus 200 may also transmit commands for turning power on/off, changing channels, and changing the volume, to the display apparatus 100 via the IR module 223.

The user input unit 230 may include a keypad, buttons, a touchpad, or a touch screen. The user may manipulate the user input unit 230 to input commands related to the display apparatus 100 to the control apparatus 200. When the user input unit 230 includes hard key buttons, the user may input the commands related to the display apparatus 100 to the control apparatus 200 by pushing the hard key buttons. When the user input unit 230 includes a touch screen, the user may input the commands related to the display apparatus 100 to the control apparatus 200 by touching soft keys on the touch screen.

The user input unit 230 may include various types of input units that may be manipulated by the user, such as a scroll key or a jog key. The user input unit 230 may also include a microphone capable of receiving a user's voice.

The user input unit 230 may include the user input unit 201 of the control apparatus 200 of FIG. 2.

The sensor 240 may include a gyro sensor 241 or an acceleration sensor 243. The gyro sensor 241 may sense information on movements of the control apparatus 200. For example, the gyro sensor 241 may sense the information on the movements of the control apparatus 200, based on x-, y-, z-axes. The acceleration sensor 243 may sense information on movement speed of the control apparatus 200. The gyro sensor 241 may additionally include a distance estimation sensor that may sense a distance between the control apparatus 200 and the display apparatus 100.

The output unit 250 may output an image signal or an audio signal which corresponds to a manipulation of the user input unit 230 or a signal received by the display apparatus 100. The user may recognize whether the user input unit 230 is manipulated or whether the display apparatus 100 is controlled, via the output unit 250.

For example, the output unit 250 may include an LED module 251, a vibration module 253, an audio output module 255, and a display module 257, which emits light, vibrates, outputs sound, and outputs an image, respectively, when the user input unit 230 is manipulated or a signal is transmitted to and received from the display apparatus 100 via the wireless communication unit 220.

The power supplier 260 supplies power to the control apparatus 200. The power supplier 260 may prevent excessive power consumption by not supplying power when the control apparatus 200 does not move for a predetermined period of time. The power supplier 260 may start to supply power again when a predetermined key in the control apparatus 200 is manipulated.

The storage 270 may store programs or application data necessary for control of the control apparatus 200 or an operation thereof.

The controller 280 controls overall operations related to controlling the control apparatus 200. The controller 280 may transmit a signal corresponding to a predetermined key manipulation of the user input unit 230 or a signal corresponding to a movement of the control apparatus 200 sensed by the sensor 240, to the display apparatus 100 via the wireless communication unit 220.

A control method according to an embodiment may be embodied as program commands executable by various computer means and may be recorded on a non-transitory computer-readable recording medium. The non-transitory computer-readable recording medium may include program commands, data files, data structures, and the like separately or in combinations. The program commands to be recorded on the non-transitory computer-readable recording medium may be specially designed and configured for embodiments of the present disclosure or may be well-known to and be usable by those of ordinary skill in the art of computer software. Examples of the non-transitory computer-readable recording medium include a magnetic medium such as a hard disk, a floppy disk, or a magnetic tape, an optical medium such as a compact disk-read-only memory (CD- ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The display apparatus and method according to the above-described embodiments may obtain information on the position of a light source around the display apparatus and provide a shadow effect to content according to the light source without adding a sensor device module.

The display apparatus and method according to the above-described embodiments may easily obtain information on the position of a light source around the display apparatus to provide a shadow effect, by providing a user interface for obtaining the information on the position of the light source around the display apparatus.

The display apparatus and method according to the above-described embodiments may provide stereoscopic effects to display content by using external information such as information of light sources, time, and weather, and may provide a differentiated experience to users.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
   a processor;
   a memory connected to the processor; and
   a display unit,
   wherein the processor is configured to:
   obtain information corresponding to a position of an external light source and a position of a fixed light source;
   control the display unit to display a content and a shadow image based on the information including a light amount of the external light source;
   based on the light amount of the external light source being greater than or equal to a predetermined amount, identify a first brightness of the shadow image corresponding to the light amount of the external light source and the position of the external light source, and control the display unit to display a state of the shadow image corresponding to the external light source and corresponding not to the fixed light source according to the identified first brightness; and
   based on the light amount of the external light source being less than the predetermined amount, identify a second brightness of the shadow image corresponding to a light amount of the fixed light source and the position of the fixed light source, and control the display unit to display the state of the shadow image corresponding to the fixed light source according to the identified second brightness.

2. The display apparatus of claim 1, wherein the processor is further configured to display a user interface representing a space in which the display apparatus is located on the display unit, and receive, via the user interface, an input for selecting a position of light sources comprising the fixed light source and the external light source in the space.

3. The display apparatus of claim 2, wherein the user interface comprises a plane corresponding to the space,
   wherein the processor is further configured to receive an input for selecting the position of the light sources on the plane, via the user interface.

4. The display apparatus of claim 2, wherein the user interface comprises a three-dimensional space corresponding to the space,
   wherein the processor is further configured to receive an input for selecting the position of the light sources in the three-dimensional space, via the user interface.

5. The display apparatus of claim 1, wherein the processor is further configured to receive position information of the display apparatus in the space.

6. The display apparatus of claim 1, wherein the external light source provides light to an indoor space from an outside of the space,
   wherein the processor is further configured to receive the information corresponding to the position of the fixed light source and the position of the external light source.

7. The display apparatus of claim 6, wherein the processor is further configured to identify the position and the light amount of the external light source based on at least one of a current time and current weather.

8. The display apparatus of claim 7, wherein the processor is further configured to identify a shape of the shadow image based on an on or off state and the position of the fixed light source when the light amount of the external light source is less than a predetermined amount.

9. The display apparatus of claim 1, wherein the state of the shadow image corresponds to at least one of a brightness of the shadow image or a shape of the shadow image.

10. A method of displaying content on a display apparatus, the method comprising:
    obtaining information corresponding to a position of an external light source and a position of a fixed light source; and
    displaying the content and a shadow image based on the information including a light amount of the external light source,
    wherein the displaying the shadow image comprises:
    based on the light amount of the external light source being greater than or equal to a predetermined amount, identifying a first brightness of the shadow image corresponding to the light amount of the external light source and the position of the external light source, and displaying a state of the shadow image corresponding to the external light source and corresponding not to the fixed light source according to the identified first brightness, and
    based on the light amount of the external light source being less than the predetermined amount, identifying a second brightness of the shadow image corresponding to a light amount of the fixed light source and the position of the fixed light source, and displaying the state of the shadow image corresponding to the fixed light source according to the identified second brightness.

11. The method of claim 10, wherein a user interface representing a space in which the display apparatus is located is displayed on a display of the display apparatus; and an input for selecting a position of light sources comprising the fixed light source and the external light source in the space is input, via the user interface.

12. The method of claim 11, wherein the user interface comprises a plane corresponding to the space,
wherein the input for selecting the position of the light sources on the plane, via the user interface.

13. The method of claim 11, wherein the user interface comprises a three-dimensional space corresponding to the space,
wherein the input for selecting the position of the light sources in the three-dimensional space, via the user interface.

14. The method of claim 10, further comprising receiving position information indicating a position of the display apparatus ins, the space.

15. The method of claim 10, further comprising receiving the information corresponding to the position of the fixed light source and the position of the external light source,
wherein the external light source provides light to an indoor space from an outside of the space.

16. The method of claim 15, further comprising identifying the position and the light amount of the external light source based on at least one of a current time and current weather.

17. The method of claim 16, further comprising identifying the shadow image based on an on or off state and the position of the fixed light source when the light amount of the external light source is less than a predetermined amount.

18. A non-transitory computer-readable storage medium storing a program for executing the method of claim 10.

* * * * *